United States Patent Office 2,972,649

Patented Feb. 21, 1961

2,972,649

PROCESS FOR ALKYLATING PARAFFINIC HYDROCARBONS

Owen H. Thomas, Chicago, and Glenn O. Michaels, Park Forest, Ill., assignors to Sinclair Refining Company, New York, N.Y., a corporation of Maine No Drawing. Filed Jan. 31, 1958, Ser. No. 712,305

3 Claims. (Cl. 260—683.53)

This invention relates to a process for the catalytic alkylation of alkanes with olefins in the vapor phase. More particularly, this invention is concerned with a process for the alkylation of low molecular weight alkanes with low molecular weight olefins in the vapor phase to make alkylate of gasoline boiling range using a catalyst which includes a noble metal and an aluminum halide Friedel-Crafts component supported on gamma-alumina. The products produced by this process are highly desirable since they are employed in gasoline for octane improvement purposes.

The use of supported Friedel-Crafts-hydrogen halide catalysts for aliphatic alkylation is well established. Unfortunately, however, such systems are rapidly deactivated due to the poisoning action of polyolefinic components formed as side products during alkylation. The employment of a catalyst of the above specified type permits the use of low hydrogen partial pressures to hydrogenate these polyolefinic materials thereby preventing catalyst deactivation. Moreover, the usual hydrocarbon feeds for hydrogen fluoride or $H_2SO_4$ alkylation consist of low molecular weight olefins and iso-alkanes. However, the presently described catalytic system suggests that higher molecular weight normal or isoparaffins can be used directly as alkylation feed. Both of these components can be converted to isoalkanes for direct alkylation with the $C_2$–$C_4$ olefins. The presence of low hydrogen partial pressures insures isomerization and hydrocracking activity and serves to prevent polyolefin deactivation of the catalyst.

In the alkylation process of the present invention paraffinic hydrocarbon materials are alkylated with olefinic hydrocarbon materials in the vapor phase using a noble metal-aluminum halide-gamma-alumina catalyst. The paraffinic hydrocarbon materials include the normal or isoalkanes in the $C_4$ to $C_{10}$ range such as n-butane, isobutane, n-hexane, the isononanes, nonane, etc. The olefinic hydrocarbon materials include the normal or isoalkanes in the $C_2$ to $C_5$ range such as the mono-olefins, ethylene, propylene, isobutene, etc. Although the paraffinic hydrocarbon feeds can be employed directly in our process, we prefer to hydrogenate the paraffinic feed prior to the alkylation using a noble metal-alumina catalyst.

The vapor phase alkylation is effected in the presence of a noble metal-aluminum halide Friedel-Crafts-activated-alumina catalyst. This catalyst generally includes a noble metal, an aluminum halide Friedel-Crafts component and, at least ultimately in the alkylation system, a hydrogen halide, all of which are supported on an alumina base. The base is usually the major component of the catalyst, constituting about 40 to 95 weight percent, preferably at least about 50%. The catalyst base is an activated or gamma-alumina such as those derived by calcination of amorphous hydrous alumina, alumina monohydrate, alumina trihydrate or their mixtures. The catalyst base precursor most advantageously is a mixture predominating, for instance about 65 to 95 weight percent, in one or more of the alumina trihydrates bayerite I, bayerite II (randomite) or gibbsite, and about 5 to 35 weight percent of alumina monohydrate (boehmite), amorphous hydrous alumina or their mixture. The alumina base can contain small amounts of other solid oxides such as silica, magnesia, boria, natural or activated clays (such as kaolinite, montmorillonite, halloysite, etc.), titania, zirconia, etc., or their mixtures.

The catalyst generally contains about 0.01 to 2 weight percent, preferably 0.1 to 0.75 weight percent, of one or more of the platinum metals of group VIII, that is platinum, palladium, rhodium, ruthenium, osmium or iridium. The small amount of noble metal may be present in the metallic form or as a sulfide, oxide or other combined form. The metal may interact with other constituents of the catalyst, but if during use the noble metal be present in metallic form then it is preferred that it be so finely divided that it is not detectable by X-ray diffraction means, i.e. that it exists as crystals of less than 50 Angstrom units size. Of the noble metals, platinum is preferred.

The aluminum halide Friedel-Crafts component usually is about 2 to 50 weight percent, preferably about 10 to 30 weight percent, of the catalyst and this component can be, for instance, $AlCl_3$, $AlF_3$, $AlBr_3$ and similar metal halides where one or more of the anions are replaced with another anion such as hydroxide. Mixtures of these Friedel-Crafts components can also be used; aluminum chloride is, however, the preferred Friedel-Crafts component.

Another component of the catalyst may be a hydrogen halide and the catalyst may advantageously contain about 0.5 to 15 wt. percent or more of a hydrogen halide. The hydrogen halides include, for instance, hydrogen chloride, hydrogen bromide, hydrogen fluoride and their mixtures and preferably the amount of this component on the alumina base is less than about 10% of the catalyst. Although the components of the catalyst can vary, as illustrated above, the preferred catalyst employed in in the alkylation process contains platinum, aluminum chloride and, at least ultimately in the alkylation system, hydrogen halide deposited on activated alumina.

The preferred base or supporting material is an activated or gamma-alumina made by calcining a precursor predominating in alumina trihydrate. An alumina of this type is disclosed in application Serial No. 288,058, filed May 15, 1952, now abandoned, and its continuation-in-part application Serial No. 489,726, filed February 21, 1955, now U.S. 2,838,444. The alumina base is derived from a precursor alumina hydrate composition containing about 65 to 95 weight percent of one or more of the alumina trihydrate forms gibbsite, bayerite I and bayerite II (randomite) as defined by X-ray diffraction anaylsis. The substantial balance of the hydrate is amorphous hydrous or monohydrate alumina. Trihydrates are present as well-defined crystallites, that is they are crystalline in form when examined by X-ray diffraction means. The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in these applications the calcined catalyst can be characterized by large surface area ranging from about 350 to about 500 or more square meters/gram when in the virgin state as determined, for example, by the BET adsorption technique. A low area catalyst prepared by treating the predominantly trihydrate base precursor is described in application Serial No. 581,250, filed April 27, 1956 now U.S. Patent No. 2,838,455. This base when in the virgin state has substantially no pores of radius less than 10 Angstrom units and the surface area of the catalyst is less than 350 square meters/gram and most advantageously is in the range of about 150 to 300 square meters/gram.

The catalyst can be advantageously prepared in accordance with a process described in copending application Serial No. 712,315, filed January 31, 1958. According to this process, the aluminum halide Friedel-Crafts catalyst is added to a noble metal-gamma-alumina composition. The noble metal-gamma-alumina composition can be prepared by known procedures. For instance, the platinum metal component can be deposited on a calcined or activated alumina, but it is preferred to add the platinum metal component to the alumina hydrate base precursor. Thus platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma-alumina modifications. The addition of the Friedel-Crafts component to the high area catalyst bases of applications Serial Nos. 288,058 and 489,726 has been found to decrease the surface area, for instance, directionally related to the amount of Friedel-Crafts component added. Use of the catalyst in the alkylation system or hydrogen pretreatment increases the area apparently through loss of the Friedel-Crafts component.

The aluminum halide Friedel-Crafts component can be added to the noble metal-alumina composition in vapor form in a flowing gas such as nitrogen, for example; however, we prefer to place the aluminum halide Friedel-Crafts component in vapor form on the platinum-alumina composition by placing the Friedel-Crafts component and the noble metal-alumina composition in a common vessel provided with some means for agitating the mixture of materials, applying heat and agitating the mixture to produce the catalyst.

A hydrogen halide component can be added to the noble metal-alumina-aluminum halide composite by supplying the hydrogen halide as such or by employing an organo-halogen compound or other substance which will produce the hydrogen halide. The hydrogen halide can be added to the composite by contacting the composite directly with hydrogen halide. When using the catalyst in a conversion process, however, such as the alkylation of $C_4$ to $C_{10}$ paraffinic-containing hydrocarbon materials with low molecular weight olefins, the hydrogen halide can be added to the noble metal-aluminum halide-alumina composite after it is placed in the alkylation reactor. Conveniently this is done by including in the paraffinic or olefinic feeds about 0.05 to 35 weight percent, advantageously about 2 to 10 weight percent of the hydrogen halide or of a hydrogen halide-producing material. The addition of the hydrogen halide in these concentrations based on the paraffin is continued over the processing period in order to maintain an adequate concentration of this component on the alumina base and insure the stability of the catalyst against undue aging. The hydrogen halide can be added separately to the reaction system, in the hydrogen-containing recycle gases, in the paraffin or olefin feedstock. Also, as pointed out above, the hydrogen halide on the alumina base might be added to the catalyst before charging it to the reactor.

When using an organo-halogen compound or other substance as the hydrogen halide supplier, it can also be employed to conveniently supply the hydrogen halide to the catalyst composite under conditions to which the catalyst may be subjected. Suitable hydrogen halide precursors include the elemental halogens, chlorine, bromine and fluorine; mono- and polyhalo-alkanes such as carbon tetrachloride, chloroform and tertiary butyl chloride; or other available materials which will be converted under the conditions of the process in which the catalyst is used, for instance when under alkylation conditions of temperatures of about 150 to 450° F. to obtain the hydrogen halide.

The alkylation reaction conditions used in the method of the present invention include a temperature sufficient to maintain the paraffinic and olefinic feeds in the vapor phase under the pressure employed. Generally, this temperature will be from about 150 to 450° F., preferably from about 200 to 300° F., while the pressure will be superatmospheric ranging from about 100 to 1000 p.s.i.g., preferably from about 200 to 500 p.s.i.g. The catalyst can be used as a fixed, moving or fluidized bed or in any other convenient type of handling system. The fixed bed system seems most advantageous at this time and the space velocity will generally in most cases be from about 0.1 to 10:1, and preferably about 0.25 to 3:1, weights of olefin per hour per weight of catalyst (WHSV). The paraffinic feed is employed in a molar ratio to the olefinic feed of generally from about 2 to 20:1, and preferably from about 4 to 8:1.

Free or molecular hydrogen must be present in our reaction system and the hydrogen to olefin molar ratio will usually be from about 0.01 to 0.25:1 or more, preferably about 0.05 to 0.1:1. Conveniently, the hydrogen concentration is maintained by recycling hydrogen-rich gases from the reaction zone. These gases contain hydrogen halide at least after the initial processing period and as there is usually no substantial consumption of the halide after this period the desired concentration in the feed can be maintained merely by recycling the hydrogen-containing gases, for instance, the hydrogen halide concentration can with advantage be about 0.5 to 35 volume percent but usually about 2 to 10 volume percent of the recycled gases or the hydrocarbon feed.

A convenient manner in which the catalyst of the present invention can be prepared is to add the Friedel-Crafts component to the base containing the platinum metal component. It is highly desirable to keep the catalyst protected from moisture to avoid hydrolysis and deactivation of aluminum halide. Thus it is most advantageous to employ this catalyst under essentially anhydrous conditions including the provision of the hydrogen halide in anhydrous form. During regeneration of the catalyst to remove carbonaceous deposits by burning in an oxygen-containing gas, some aluminum halide may be lost. Thus, it may be necessary to add additional amounts of this halide as by sublimation before continuing the alkylation.

Even though our catalyst can be employed directly in the alkylation system, it is preferred that it be pretreated with free or molecular hydrogen or a mixture of hydrogen and hydrogen halide. For example, the catalyst can be heated to about 650° F. in a slowly flowing stream of hydrogen or hydrogen-hydrogen chloride mixture for a period of time sufficient to activate the catalyst. It may be desirable to employ lower temperatures in the pretreatment to avoid undue loss of aluminum halide by sublimation even though this may decrease the rate of activation. After the activation the pressure can be increased as desired and the feed charged to the reaction system. Generally, the activity of the catalyst increases during the initial portion of operation and then holds a high level of activity for long processing periods, thus exhibiting good life or resistance to aging. It seems possible that upon the addition of the feed the catalyst is comprised of the noble metal and a complex of the Friedel-Crafts component, the feed components and the hydrogen halide supported on the alumina base.

The following specific examples will serve to illustrate our invention but they are not to be considered limiting.

EXAMPLE I

(A)

A noble metal-alumina composition of the kind described in application Serial No. 489,726, filed February 21, 1955, can be employed in the process of our invention. The composition of this application can be made as follows. Pure aluminum metal is dissolved in pure hydrochloric acid, and the resulting solution is mixed with deionized water to form an aqueous aluminum chloride solution and an alumina gel is prepared equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquid and washed to <0.2% chloride by successive filtrations and reslurryings in deionized water until the desired chloride concentration is reached. In each reslurrying, ammonia is added to give a pH of about 9. The washed hydrate is covered with water in a container and aged at about 90° F. until it is approximately 70% trihydrate, the remaining being substantially of the amorphous or monohydrate forms. The total hydrate composition is comprised of 42% bayerite, 18% randomite, 11% gibbsite, 20% boehmite, and 9% amorphous as determined by X-ray diffraction analysis. The aged hydrate is mixed with deionized water in a rubber-lined container to provide a slurry of about 7 weight percent $Al_2O_3$ at a pH of about 8.0. A chloroplatinic acid solution in deionized water (0.102 gram platinum per milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company Infra-Red Moisture Meter containing a 125 watt bulb, Cat. No. 26675. The resulting mixture is forced through a die plate having holes 1/16" in diameter bolted to a 3½" Welding Engineers screw extruder. The resulting strands are broken to particles of length varying generally between about 1/16" to 1".

The particles are dried at 230° F. and calcined by heating to 925° F. in a flow of nitrogen gas followed by a flow of air while the catalyst is maintained at a temperature in the range of 865 to 920° F. The composition thus produced analyzes about 0.6 weight percent of platinum which is in sufficiently divided form so as to exhibit by X-ray diffraction studies the substantial absence of crystallites or crystals of size larger than 50 Angstrom units. After the calcination the catalyst has an area (BET method) within the range from about 350 to 550 square meters/gram.

(B)

A platinum-alumina composition prepared essentially as described above, except that air was used for the complete calcination procedure and containing about 0.6% platinum was employed in the process of the present invention by the following procedure. A one-liter, three-necked flask was fitted with a heating mantle, thermometer and an air inlet line having a drying tower filled with Drierite. The flask was fastened to a Syntron Paper Jogger which provided agitation of the composition during the impregnation. The flask was swept out with dry air for about 10 minutes. 150 grams of the platinum-alumina composition and 45 grams of aluminum chloride were charged to the flask. The air was turned off, the flask was stoppered and the drying tower was disconnected from the air line. Heating of the flask was begun and the temperature of the mixture was brought slowly to approximately 445° F. in about three hours. The heat was turned off and the catalyst was cooled and transferred to a moisture-tight container. The resultant catalyst contained 19.3 weight percent aluminum chloride based upon the platinum-alumina catalyst.

(C)

Hydrogen chloride is added to the platinum-aluminum halide-alumina composite by adding hydrogen chloride to the feed while employing the catalyst in an alkylation process. This procedure is illustrated by the following.

A 60 g. charge of platinum-aluminum halide-alumina catalyst, prepared essentially as described above in Example I(B), is placed in a 1" internal diameter (I.D.) Universal reactor and subjected to the activation procedure generally used for this catalyst which includes heating the catalyst bed to a temperature of 500° F. at atmospheric pressure for three hours with hydrogen at a flow of 1.5 cubic feet of hydrogen per hour. The temperature in the reactor is dropped to 250° F. and the pressure raised to 500 p.s.i.g. with hydrogen. At this time HCl gas is passed through the catalyst bed until HCl is detected in the gas at the reactor outlet. An isobutane-propylene blend in a 4:1 mole ratio is then passed through the reactor at a WHSV value of 0.5 based on the propylene fraction of the feed. The hydrogen to propylene mole ratio is controlled at 0.05 and the weight percent of HCl concentration based upon the propylene is maintaned at a value of 3. The liquid alkylate product[1] is isolated in a cold trap in substantial yields based on the propylene fraction of the feed.

EXAMPLE II

A 90 g. charge of platinum-aluminum halide-alumina catalyst, prepared essentially as described above in Example I(B), is placed in a 1" I.D. Universal reactor and subjected to essentially the same activation procedure used for a similarly prepared catalyst and exemplified in Example I(C). After this activation procedure is completed, the reaction temperature is dropped to 300° F. and the pressure raised with hydrogen to 200 p.s.i.g. Hydrogen chloride gas is passed through the catalyst bed until HCl is detected in the gases collected at the reactor outlet. An isobutane-Udex raffinate (U.R.)[2]-propylene blend in a 2:1:1 mole ratio is passed through the reactor at a WHSV value of 0.25 based on the propylene fraction of the feed. The hydrogen to propylene mole ratio is controlled at 0.1 and the weight percent of hydrogen chloride concentration based upon the propylene feed is maintained at a value of 10. The liquid alkylate produce[3] is isolated in a cold trap in substantial yields based on the propylene fraction of the feed.

EXAMPLE III

A 120 gram charge of platinum-aluminum halide-alumnia catalyst, prepared essentially as described above

---

[1] Liquid alkylate product includes a predominant amount of dimethyl pentane and small amounts of methyl pentane and isopentane.

[2] Udex raffinate is a $C_7$ to $C_9$ paraffin-rich feed separated from the effluent of reforming systems through the use of a glycol-water extraction procedure and typically contains about 1.4 weight percent of isoheptane, 31.5 weight percent of isooctane, 21.7 weight percent of normal octane, 40.6 weight percent of isononane, and 4.9 weight percent of normal nonane.

[3] Liquid alkylate product includes a predominant amount of isopentanes and isohexanes and small amounts of isoheptanes.

in Example I(B), is placed in a 1" I.D. Universal reactor and the catalyst bed is heated to 300° F. at 200 p.s.i.g. under hydrogen atmosphere. Udex raffinate, essentially the same type of U.R. employed in Example II, is passed over the catalyst at a WHSV value of 0.75. The hydrogen to raffinate mole ratio is maintained at 15:1 and the HCl to raffinate ratio is controlled at 0.5. The unconverted raffinate is collected in receiver at room temperature while the $C_4$ to $C_5$ cracking products are used as paraffinic feed and blended with a propylene stream in the ratios outlined in Example I. This blend is then processed in accordance with our process at the conditions outlined in Example I. The liquid alkylate products[4] is isolated in a cold trap in substantial yields based on the propylene fraction of the feed.

It is claimed:

1. A process for alkylating $C_4$ to $C_{10}$ paraffinic hydrocarbon materials with low molecular weight olefinic hydrocrabon materials, the step comprising contacting the hydrocarbon materials with a catalyst in a reaction zone under alkylating conditions including the presence of hydrogen halide in the reaction zone, a temperature from about 150 to 450° F., and providing hydrogen in the reaction zone in a hydrogen to olefinic hydrocarbon material molar ratio from about 0.01 to 0.25:1, said catalyst consisting essentially of about 0.01 to 2% of a platinum group noble metal, about 2 to 50% of an aluminum halide-Friedel-Crafts component and about 40 to 95% of an activated alumina.

2. The method of claim 1 in which the low molecular weight olefinic hydrocarbon materials include the $C_2$ to $C_5$ olefins, the alkylating conditions include a temperature from about 200 to 300° F., a pressure from about 200 to 500 p.s.i.g., a molar ratio of the paraffinic feed to the olefinic feed of about 2 to 20:1 and hydrogen halide is provided in a concentration of about 0.5 to 35% based on the hydrocarbon feed.

3. The method of claim 2 wherein the noble metal is platinum and is about 0.1 to 0.75% of the catalyst, the aluminum halide is aluminum chloride and is about 10 to 30% of the catalyst and the alumina is derived by calcination of an alumina hydrate precursor consisting essentially of about 5 to 95% of alumina trihydrate and about 5 to 35% of a member selected from the group consisting of amorphous hydrous alumina, alumina monohydrate and their mixture and the activated alumina has an area of about 350 to 550 square meters/gram.

[4] Liquid alkylate product includes a predominant amount of dimethyl pentanes and dimethyl hexanes and small amounts of methyl pentane and isopentane.

References Cited in the file of this patent

UNITED STATES PATENTS

| | | |
|---|---|---|
| 2,318,781 | Ipatieff et al. | May 11, 1943 |
| 2,546,180 | Wiczer | Mar. 27, 1951 |
| 2,838,444 | Teter et al. | Jun. 10, 1958 |

FOREIGN PATENTS

| | | |
|---|---|---|
| 555,861 | Great Britain | Sept. 9, 1943 |